United States Patent [19]

Blaese

[11] E Patent Number: Re. 33,743

[45] Reissued Date of Patent: Nov. 12, 1991

[54] ON-GLASS ANTENNA

[76] Inventor: Herbert R. Blaese, 3314 Olcott Ave., Chicago, Ill. 60634

[21] Appl. No.: 254,260

[22] Filed: Oct. 6, 1988

Related U.S. Patent Documents

Reissue of:

[64] Patent No.: 4,658,259
Issued: Apr. 14, 1987
Appl. No.: 708,667
Filed: Mar. 6, 1985

[51] Int. Cl.[5] ..... H01Q 1/32

[52] U.S. Cl. ..... 343/715; 343/713; 343/826; 343/830

[58] Field of Search ..... 343/711, 713, 715, 825, 343/826, 829, 830, 850, 900, 906

[56] References Cited

U.S. PATENT DOCUMENTS

| | | | |
|---|---|---|---|
| 2,206,820 | 7/1940 | Mydlil | 343/888 |
| 2,541,107 | 2/1951 | Selgin | 343/830 |
| 3,971,029 | 7/1976 | Torii | 343/704 |
| 4,003,057 | 1/1977 | Luedtke et al. | 343/713 |
| 4,089,817 | 5/1978 | Kirkendall | 343/850 |
| 4,091,386 | 5/1978 | Luedtke et al. | 343/713 |
| 4,238,799 | 12/1980 | Parfitt | 343/715 |
| 4,839,660 | 6/1989 | Hadzoglou | 343/715 |

FOREIGN PATENT DOCUMENTS

| | | | |
|---|---|---|---|
| 0137391 | 4/1985 | European Pat. Off. | 343/715 |
| 541870 | 5/1956 | Japan . | |
| 53-109333 | 8/1978 | Japan . | |
| 744119 | 2/1956 | United Kingdom . | |

OTHER PUBLICATIONS

Radio Shack Dictionary of Electronics, Fifth Edition, 1978, edited by Rudolf F. Graf, pp. 318-319.
Japanese publication-JP-Y2-57-26406-Jun. 1979, Antenna for Automobile.
Japanese publication-JP-Y2-32-13040-Oct. 19, 1957, Antenna Connector.
"VHF-UHF Ground Plane Kit" Sheet-1 page (1973).
Antenna Specialists Catalog Sheet (1979).
ARRL Antenna Book, pp. 59-60 (1980).
ARRL Radio Amateurs Handbook, pp. 369-370 (1969).
Kennedy, "Electronic Communication Systems" Second Edition, pp. 297-301 (1981).
Rudge, et al., "The Handbook of Antenna Design", pp. 1506-1509, 1512, 1513 (1982, 1983, 1986).

*Primary Examiner*—Michael C. Wimer
*Attorney, Agent, or Firm*—Gerstman & Ellis Ltd.

[57] ABSTRACT

An antenna is disclosed which is particularly suitable for use with a cellular mobile phone. The antenna may be mounted on the rear window of a vehicle, and it includes a current fed one-quarter wavelength radiator adapted for mounting on one side of the window. An electrically conductive inner transfer member is mounted on the inside of the window in alignment with the radiator and a pair of spaced field-cancelling conductors are attached to the inside of the window and are spaced from the inner transfer member. The central conductor of an RF coaxial cable is coupled to the inner transfer member and the surrounding ground conductor of the coaxial cable is coupled to the field-cancelling conductors. In one embodiment, the one-quarter wavelength radiator comprises a pair of parallel, spaced radiator elements. RF energy is transferred through the vehicle window and the drilling of a hole for coupling the radiator to the coaxial cable is unnecessary.

15 Claims, 1 Drawing Sheet

ON-GLASS ANTENNA

Matter enclosed in heavy brackets [ ] appears in the original patent but forms no part of this reissue specification; matter printed in italics indicates the additions made by reissue.

BACKGROUND OF THE INVENTION

The present invention concerns a novel antenna and, more particularly, an antenna for mounting on a glass plate with the radiator extending from one side of the glass plate and with the electrical wiring extending from the opposite side of the glass plate whereby energy is transferred through the glass plate and the drilling of a hole for coupling the radiator to the electric wiring is unnecessary.

Vehicle owners are generally apprehensive about drilling holes in their vehicles and for that reason a window-mounted antenna which transfers RF energy through the glass is desirable. One prior art type of on-glass antenna is disclosed in U.S. Pat. No. 4,238,799. This prior art antenna utilizes a radiator that must be voltage fed, requiring the radiator to be an electrical half wavelength or multiples thereof. Since the feed point of the radiator is also the mounting point, this places the high impedance or high voltage point directly on the glass mounting surface.

While glass itself is a good low loss insulator, when rain and snow mix with contaminants such as dirt and salt are introduced on the glass surface, a serious degrading of performance will result because of the detuning and loss. This condition becomes worse as the frequency of operation is increased. In accordance, with U.S. Pat. No. 4,238,799, in order to voltage feed the radiator, which is affixed to the outside of the glass, a coupling box containing an LC resonant circuit is attached to the inside of the glass. This resonant circuit inherently has some loss. The loss increases at this circuit becomes detuned.

It is an object of the present invention to provide an on-glass antenna that alleviates many of the problems concomitant with the prior art on-glass antenna disclosed in U.S. Pat. No. 4,238,799.

Another object of the present invention is to provide an on-glass antenna that is simple in construction and is easy to manufacture.

A further object of the present invention is to provide an on-glass antenna in which contaminants and water will have the least effect on performance and detuning.

A still further object of the present invention is to provide an on-glass antenna having a relatively wide band.

Other objects and advantages of the present invention will become apparent as the description proceeds.

SUMMARY OF THE INVENTION

In accordance with the present invention, an antenna is provided for mounting on a glass plate with a radiator extending from one side of the glass plate and with an electrical connector and electrical wiring extending from the opposite side of the glass plate. In this manner, energy is transferred through the glass plate and the drilling of a hole for connecting the radiator to the electrical connector is unnecessary.

The improvement of the present invention comprises a current fed radiator that is connected to an electrically conductive outer transfer plate. The outer transfer plate is adapted for affixation to one side of the glass plate.

An electrically conductive inner transfer member is adapted for affixation to the other side of the glass plate in alignment with the outer transfer plate.

An electrically conductive field-cancelling member *having non-volume containing portions* is provided for affixation to the other side of the glass plate in a spaced relation to the inner transfer member. On the other side of the glass plate, there is also provided an electrical connector having a main electrical contact and a ground contact. The main electrical contact is adapted for engagement with the inner transfer member and the ground contact is adapted for engagement with the field-cancelling member. The electrical connector also includes means for coupling the electrical wiring to the main contact and to the ground contact.

In the illustrative embodiment, the current fed radiator comprises a one-quarter wavelength radiator, and greater bandwidth is provided by cophasing multiple radiators. The multiple radiators are spaced elements which are generally parallel to each other and are adapted for extension at an angle of about 45° with respect to the glass plate.

In the illustrative embodiment, the outer transfer plate comprises a weather-resistant carrier having an electrically conductive metal plate member on its underside for affixation to the one side of the glass plate. The inner transfer member comprises an electrically conductive tape member for affixation to the other side of the glass plate. The field-cancelling member comprises a pair of electrically conductive tape members for affixation to the other side of the glass plate in spaced relationship to and on opposed sides of the inner tape member.

In the illustrative embodiment, the ground contact comprises a pair of electrical contact elements with one of the pair being adapted for engaging one of the field-cancelling members and the other of the pair being adapted for engaging the other of the field-cancelling members. The electrical wiring comprises an RF coaxial cable having a central conductor and a surrounding ground conductor. The coupling means comprises means for coupling the central conductor to the main contact and also means for coupling the ground conductor to the ground contact.

A more detailed explanation of the invention is provided in the following description and claims, and is illustrated in the accompanying drawings.

DETAILED DESCRIPTION OF THE ILLUSTRATIVE EMBODIMENT

Figure 1:
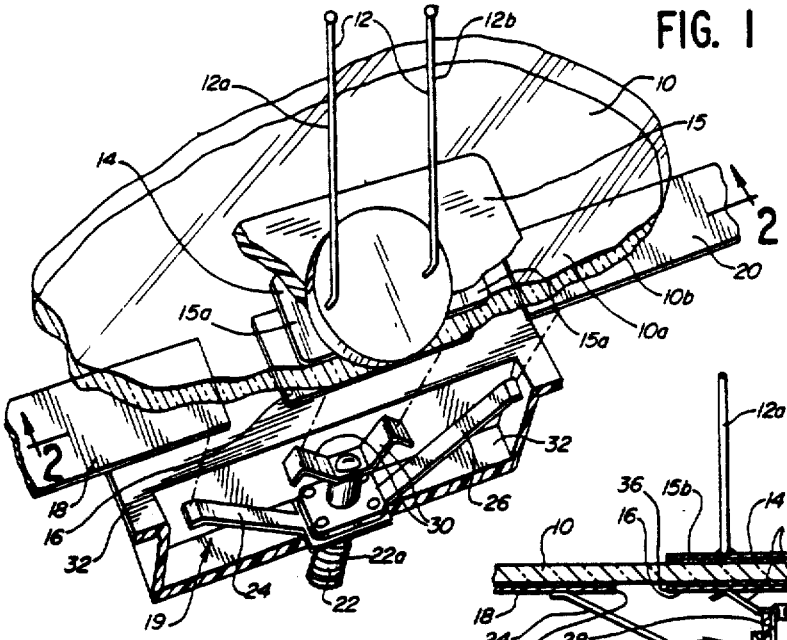
FIG. 1 is a perspective exploded view of an on-glass antenna constructed in accordance with the principles of the present invention.
Figure 2:
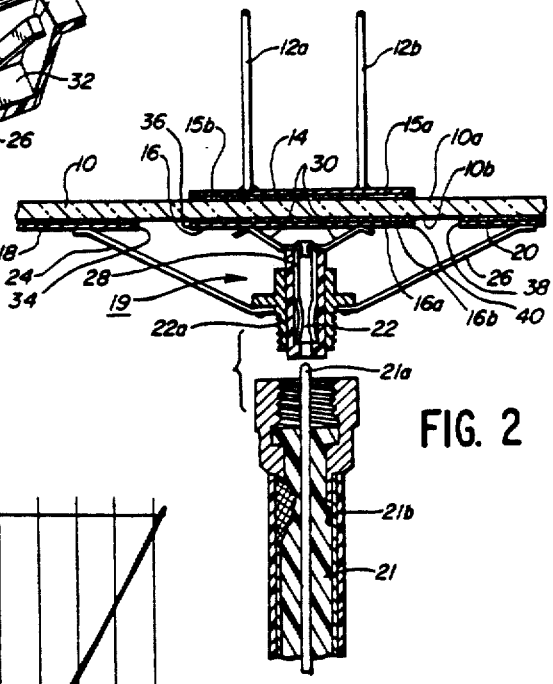
FIG. 2 is a diagrammatic view of the on-glass antenna of FIG. 1.

Referring to FIGS. 1 and 2, the glass plate window 10 of a vehicle is illustrated therein, preferably the rear glass window of the vehicle, and there is a quarter wavelength radiator 12 positioned on the exterior surface 10a of window 10. It is preferred that radiator 12 comprise a pair of cophased quarter wavelength elements 12a and 12b, which are spaced in parallel to each other and extend generally at an angle of about 45° with respect to the glass plate 10. Although no limitation is intended, in the illustrative embodiment the on-glass antenna is used for cellular mobile telephone transmission and reception, and elements 12a and 12b are each 3 inches in length and are spaced 1 inch from each other.

Radiator 12 (i.e., elements 12a and 12b) are mounted on an outer transfer plate 14 which comprises a plastic weather-resistant carrier 15 having an electrically conductive metallic plate 15a. In the illustrative embodiment, the metallic plate 15a has a dimension of ⅝ inch by 1⅝ inches, and elements 12a and 12b are in electrically conductive relationship to the metal plate 15a. Outer transfer plate 14 is affixed to the outer surface 10a of glass window 10 by a suitable adhesive 15b, such as a pressure-sensitive adhesive which is applied at the factory and is covered with tear-off paper strips.

The remaining portions of the antenna assembly are located on the inside of the vehicle, i.e., on the opposite surface 10b of the glass window 10. Such elements include an electrically conductive inner transfer plate 16, formed of a metal tape 16a having a pressure-sensitive adhesive surface 16b which enables the metal tape to be affixed to surface 10b of glass plate 10. It is preferred that inner transfer plate 16 have the same dimension as outer transfer plate 14 and that the transfer plates 14 and 16 be aligned with each other so as to align inner transfer plate 16 with the radiator 12.

A pair of field-cancelling electrical conductive members 18 and 20 are provided. These members 18 and 20 comprise electrically conductive metal tapes, each preferably being equal in size and, as illustrated most clearly in FIG. 1, these tapes are spaced from each other and from the interior transfer plate 16 and are positioned on opposite sides of interior transfer plate 16. Metal tapes 18 and 20 have a pressure-sensitive surface which enables them to be affixed to surface 10b of glass plate 10. Although no limitation is intended, in the illustrative embodiment, each of field-cancelling members 18 and 20 have a dimension of ⅝ inch by 2⅞ inches. The field-cancelling conductors are in a horizontal plane and operate to cancel each other out, thus effectively not radiating in that horizontal plane. As a result, radiation is consistent in the vertical plane only.

Alternatively, the field-cancelling electrical conductive members 18, 20 may comprise a pair of conductive wires or fingers which extend outwardly from an electrical connector 20 described below, with the wires or fingers extending horizontally. As another alternative, members 18, 20 may be wires attached on the inside of the car to a location adjacent the window but not on the window.

An electrical connector 19 is provided for coupling an RF coaxial cable 21 from the transmitter/receiver to the antenna. In the illustrative embodiment, the coaxial cable 21 is a conventional 50 ohm line having a central main conductor 21a and a surrounding ground conductor 21b. A conventional RF coaxial cable female receptacle 22 is carried by electrical connector 19. The outer circumference 22a of female connector 22, which conventionally forms the ground connection, is conductively connected to a pair of electrically conductive metal fingers 24 and 26. The central conductor 28 of RF coaxial female connector 22 is fastened to intermediate electrically conductive finger 30. Connector 19 has a surface 32 which is adapted for adhesive connection to surface 10b of glass plate 10, directly under inner transfer plate 16. When so aligned, intermediate finger 30 will be in electrical engagement with inner transfer plate 16, finger 24 will be in electrical field-cancelling conductor 18 and finger 26 will be in electrical connection with field-cancelling conductor 20. In order to provide secure electrical connections, fingers 24, 26 and 30 are formed of copper sheet material having a spring-like resilience so that when connector 19 is fastened to surface 10b of glass window 10, the fingers 24, 26 and 30 will press tightly against the respective conductive tapes.

Alternatively, inner transfer plate 16 may comprise an electrically conductive member having a lip extending toward connector 19 for receiving connector 20 and enabling it to be affixed to the inner transfer plate 16 and held in place therewith. Electrical connector 19 includes a plastic housing 32 defining an opening for receiving the coaxial cable from the transmitter/receiver.

It can be seen that the illustrative embodiment utilizes a quarter wave current fed radiator with two field-cancelling conductors. The field-cancelling conductors substitute for a ground plane, as is required in prior art constructions. By being current fed, the quarter wave radiator makes the radiator mounting spot the low impedance and low voltage point. In this manner, contaminants and water will have the least effect on performance and detuning. This arrangement can be designed to match the coaxial 50 ohm line directly, thereby eliminating the LC circuit that is required in the prior art construction disclosed in U.S. Pat. No. 4,238,799.

It has been found that by using two radiator elements 12a, and 12b, excellent omnidirectional characteristics are obtained and a relatively wide bandwidth is achieved. The two cophased radiators minimize the possibility of undesirable space diversity by which two signals arriving out of phase at the antenna at the same time may cancel each other.

Figure 3:
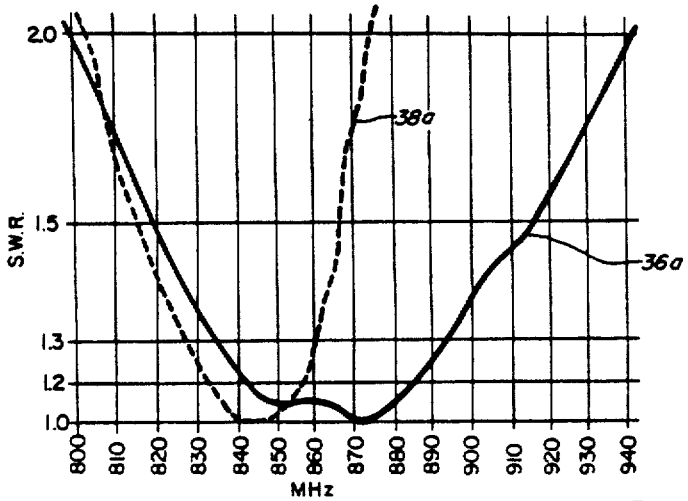
FIG. 3 is a graph showing a standing wave ratio/-bandwidth comparison between a commercial prior art on-glass antenna and an antenna constructed in accordance with the principles of the present invention.

Referring to FIG. 3, a comparison is shown for the on-glass antenna of FIG. 1 (illustrated in full line 36a) and the prior art Antenna Specialist/Avanti APRD 850.3T "on-glass" antenna (illustrated in dotted line 38a). The Antenna Specialist/Avanti antenna is a commercial prior art antenna constructed along the lines of the antenna disclosed in U.S. Pat. No. 4,238,799. It can be seen that in the cellular transmission/reception band, the bandwidth of the antenna of FIG. 1 is substantially greater than the bandwidth of the prior art on-glass antenna.

Although two radiator elements 12a and 12b are desirable, in another embodiment a single radiator, that is centrally positioned with respect to outer transfer plate 14, is provided. The single radiator element 12 is also a quarter wavelength current fed radiator, and in the illustrative embodiment is 3 inches in length for cellular mobile phone transmission/reception. When affixed to surface 10b of glass window 10, it extends generally at an angle that is about 45° with respect to the window 10. Alternatively, radiator elements may be stacked to obtain higher gain at the sacrifice of bandwidth.

Although no limitation is intended, in the illustrative embodiment, the space between the end 34 of field-cancelling conductor 18 and end 36 of interior transfer plate 16 is ½ inch. Likewise, the space between end 38 of field-cancelling conductor 20 and end 40 of interior transfer plate 16 is ½ inch.

Although illustrative embodiments of the invention have been shown and described, it is to be understood that various modifications and substitutions may be made by those skilled in the art without departing from the novel spirit and scope of the present invention.

What is claimed is:

1. In an antenna for mounting on a motor vehicle's glass plate with a radiator extending from a first side of the glass plate and with an RF coaxial cable extending from the opposite, second side of the glass plate whereby RF energy is transferred through the glass plate and the drilling of a hole for connecting the radiator to the electrical connector is unnecessary, the improvement comprising, in combination:

a current fed one-quarter wavelength radiator extending in a first direction and connected to an electrically conductive outer RF transfer member, said outer transfer member being adapted for affixation to said first side of the glass plate;

said outer transfer member comprising a weather-resistant carrier having an electrically conductive member on its underside for affixation to said first side of the glass plate;

an electrically conductive inner RF transfer member adapted for affixation to said second side of the glass plate in alignment with said other transfer member;

said inner transfer member comprising an electrically conductive tape member for affixation to said second side of the glass plate;

a pair of electrically conductive field-cancelling tape members adapted for location on said second side of the glass plate in a spaced relation to and on opposed sides of said inner tape member and extending in a direction that is significantly different from said first direction;

an electrical connector having a main electrical contact and a pair of ground contacts and being adapted for affixation adjacent said other side of the glass plate with said main electrical contact in engagement with said inner transfer member and with one of said pair of electrical contacts being in engagement with one of said field-cancelling tape members and the other of said pair of electrical contacts being adapted for engaging the other of said field-cancelling tape members;

said RF coaxial cable having a central conductor and a surrounding ground conductor;

said electrical connector also including means for coupling said central conductor to said main contact and means for coupling said ground conductor to said ground contacts.

2. In an antenna as described in claim 1, wherein said one-quarter radiator comprises a pair of spaced elements which are generally parallel to each other and are adapted for extension at an angle of about 45° with respect to the glass plate.

3. In an antenna for mounting on a monitor vehicle's glass plate with a radiator extending from a first side of the glass plate and with an electrical connector and electrical wiring extending from the opposite, second side of the glass plate whereby energy is transferred through the glass plate and the drilling of a hole for connecting the radiator to the electrical connector is unnecessary, the improvement comprising, in combination:

a current fed radiator extending in a first direction and connected to an electrically conductive outer RF transfer member, said outer transfer member being adapted for affixation to said first side of the glass plate;

an electrically conductive RF inner transfer member adapted for affixation to said second side of the glass plate in alignment with said outer transfer member;

an electrical connector having a main electrical contact and a ground contact and being adapted for affixation adjacent said second side of the glass plate with said main electrical contact in engagement with said inner transfer member without the need for a resonant circuit interposed between the electrical wiring and the inner transfer member;

an electrically conductive field-cancelling member adapted for location on said second side of the glass plate adjacent to but in electrically spaced relation to said inner transfer member and extending in a direction that is significantly different from said first direction;

said field-cancelling member having a first non-volume containing portion thereof on one side of the inner transfer member and a non-volume containing and substantially balanced second portion on the other side of the inner transfer member; said field-cancelling member being operative to cancel the electromagnetic field in the plane of the field-cancelling member;

said ground contact of said electrical connector being adapted for engagement with said field-cancelling member; and said electrical connector also including means for coupling said electrical wiring to said main contact and to said ground contact.

4. In an antenna as described in claim 3, wherein said current fed radiator comprises a one-quarter wavelength radiator.

5. In an antenna as described in claim 4, wherein said one-quarter wavelength radiator comprises a pair of spaced radiator elements.

6. In an antenna as described in claim 5, wherein said spaced elements are generally parallel to each other and adapted for extension at an angle of about 45° with respect to the glass plate.

7. In an antenna as described in claim 3, said outer transfer member comprising a weather-resistant carrier having an electrically conductive member on its underside for affixation to said first side of the glass plate.

8. In an antenna as described in claim 3, said inner transfer member comprising an electrically conductive tape member for affixation to said second side of the glass plate.

9. In an antenna as described in claim 3, said field cancelling member comprising a pair of electrically conductive tape members for affixation to said other side of the glass plate in electrically spaced relation to and on opposed sides of said inner transfer member.

10. In an antenna as described in claim 9, said ground contact comprising a pair of electrical contact elements with one of said pair being adapted for engaging one of said field-cancelling tape members and the other of said pair being adapted for engaging the other of said field-cancelling tape members.

11. In an antenna as described in claim 3, said electrical wiring comprising an RF coaxial cable having a central conductor and a surrounding ground conductor, said coupling means comprising means for coupling said central conductor to said main contact and means for coupling said ground conductor to said ground contact.

12. In an antenna as described in claim 3, said field-cancelling member comprising a pair of electrically conductive members carried by said electrical connector.

13. In an antenna as described in claim 3, in which said field-cancelling member is affixed to said second side of the glass plate.

*14. In an antenna for mounting on a motor vehicle's glass plate with a radiator extending from a first side of the glass plate and with an electrical connector and electrical wiring extending from the opposite, second side of the glass plate whereby energy is transferred through the glass plate and the drilling of a hole for connecting the radiator to the electrical connector is unnecessary, the improvement comprising, in combination:*

*a current fed radiator extending in a first direction and connected to an electrically conductive outer RF transfer member, said outer transfer member being adapted for affixation to said first side of the glass plate;*

*an electrically conductive RF inner transfer member adapted for affixation to said second side of the glass plate in alignment with said outer transfer member;*

*an electrical connector having a main electrical contact and a ground contact and being adapted for affixation adjacent said second side of the glass plate with said main electrical contact in engagement with said inner transfer member;*

*an electrically conductive field-cancelling member adapted for location on said second side of the glass plate adjacent to but in electrically spaced relation to said inner transfer member and extending in a direction that is significantly different from said first direction;*

*said field-cancelling member having a first non-volume containing portion thereof on one side of the inner transfer member and a non-volume containing and substantially balanced second portion on the other side of the inner transfer member; said field-cancelling member being operative to cancel the electromagnetic field in the plane of the field-cancelling member;*

*said ground contact of said electrical connector being adapted for engagement with said field-cancelling member; and*

*said electrical connector also including means for coupling said electrical wiring to said main contact and to said ground contact.*

*15. In an antenna for mounting on a motor vehicle's glass plate with a radiator extending from a first side of the glass plate and with electrical wiring extending from the opposite, second side of the glass plate whereby energy is transferred through the glass plate and the drilling of a hole for connecting the radiator to the electrical wiring is unnecessary, the improvement comprising, in combination:*

*a current fed radiator extending in a first direction and connected to an electrically conductive outer RF transfer member, said outer transfer member being adapted for affixation to said first side of the glass plate;*

*an electrically conductive RF inner transfer member adapted for affixation to said second side of the glass plate in alignment with said outer transfer member, said electrical wiring adapted for location on said second side of the glass plate including a said wire and a ground wire;*

*means for coupling said main wire to said inner transfer member;*

*an electrically conductive field-cancelling member adapted for location on said second side of the glass plate adjacent to but in electrically spaced relation to said inner transfer member and extending in a direction that is significantly different from said first direction;*

*said field cancelling member having a first non-volume containing portion thereof on one side of the inner transfer member and a non-volume containing and substantially balanced second portion on the other side of the inner transfer member; said field-cancelling member being operative to cancel the electromagnetic field in the plane of the field-cancelling member; and*

*means for coupling said ground wire to said field-cancelling member.*

* * * * *